A. F. LAPHAM.
Device for Drawing and Measuring Liquids.
No. 8,682. Reissued April 22, 1879.
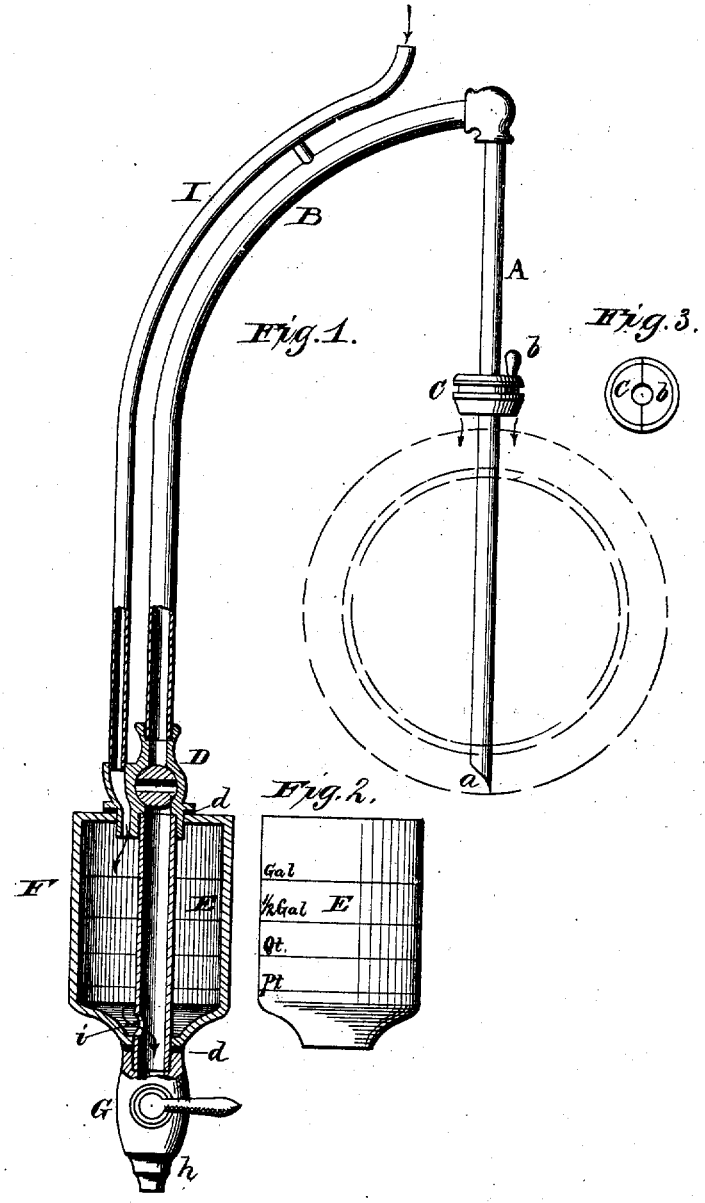
WITNESSES
Franck L. Durand
H. Aubrey Fontaine
By
Amos F. Lapham INVENTOR
Alexander Mathon
ATTORNEYS
N. PETERS, PHOTO-LITHOGRAPHER, WASHINGTON, D. C.

UNITED STATES PATENT OFFICE.

AMOS F. LAPHAM, OF MARION, OHIO.

IMPROVEMENT IN DEVICES FOR DRAWING AND MEASURING LIQUIDS.

Specification forming part of Letters Patent No. 209,904, dated November 12, 1878; Reissue No. 8,682, dated April 22, 1879; application filed March 6, 1879.

*To all whom it may concern:*

Be it known that I, AMOS F. LAPHAM, of Marion, in the county of Marion and State of Ohio, have invented certain new and useful Improvements in Devices for Drawing and Measuring Liquids; and I do hereby declare that the following is a full, clear, and exact description thereof, reference being had to the accompanying drawings, and to the letters of reference marked thereon, which form a part of this specification.

The nature of my invention consists in the construction and arrangement of a device for drawing and measuring coal-oil and other liquids from a cask or barrel, as will be hereinafter more fully set forth.

In order to enable others skilled in the art to which my invention appertains to make and use the same, I will now proceed to describe its construction and operation, referring to the annexed drawings, in which—

Figure 1 is a side view, partly in section, of my invention applied to a siphon. Fig. 2 is a side view of the measure, and Fig. 3 shows a bung used with the device.

E represents a glass measure of any suitable dimensions, through which is passed a tube, F. The ends of this tube project beyond the top and bottom of the measure, and on the same are screwed stop-cocks D and G, each stop-cock forming a burr, between which and the glass measure a leather or other washer, *d*, is inserted. When these stop-cocks are tightened the measure is ready to receive the contents of the barrel.

The lower end of the stop-cock G is provided with a nozzle, *h*, of conical or other suitable shape, to convey liquids from the measure to vessels for retail or otherwise.

In the lower part of the tube F, within the measure, is a hole, *i*, to emit the liquid from the stop-cock D above and fill the measure, and the same hole is for the egress of the liquid when the stop-cock G below is open.

In the stop-cock D, above the measure and below the shut-off of said stop-cock, is connected a pipe, I, for the escape of air. This pipe is to be closed in starting the liquid from the barrel, as follows: Have the measure full, or partly so, and then close the upper end of the air-pipe I and open both stop-cocks, and the current is complete from the barrel without any pump or otherwise.

The measuring is as follows: The upper stop-cock, D, is left open and the measure is filled. Then by closing the upper stop-cock, D, and opening the lower stop-cock, G, any quantity less than what the measure holds can be drawn off. By leaving a small amount of liquid in the measure the device is always ready for use, making it entirely automatic when attached to a siphon, as hereinafter described; or by opening the upper stop-cock, D, any desired quantity can be drawn into the measure, and then by closing said stop-cock and opening the lower stop-cock, G, such quantity is drawn off from the measure.

The measure is preferably made of glass, but may be made of any other suitable material, and in such case provided with glass tubes. In all cases the glass should be marked or graduated.

The stop-cock D at the upper end of the measure is shown as screwed onto the long leg B of a siphon, of which A is the short leg. When such siphon is used the short leg A is dropped into the bung-hole of the barrel; and this short leg is pointed at the lower end, as shown at *a*, to hold in a stave in the lower part of the barrel.

C represents a bung inclosing this leg or tube, which bung is made in two parts, with an air-hole at *b*, to be closed or left open at will. The hole in this bung is made large enough to close tightly around the tube, to prevent the escape or waste of the coal-oil or other liquid. It supports the tube in its proper place in the bung-hole, and is to be driven in tight around the tube.

The various tubes must be made of such material as will best answer for the kind of liquid to be drawn and measured with the device.

Having thus fully described my invention, what I claim as new, and desire to secure by Letters Patent, is—

1. The within-described measuring device, consisting of the vessel E, central tube, F, with aperture *i*, stop-cocks D G, and air-vent I, substantially as herein set forth.

2. A siphon provided with a graduated measure, connected to the long leg thereof, for the purposes herein set forth.

3. The combination of the siphon A B, measure E, stop-cocks D G, and the tube F, with opening *i*, all constructed substantially as and for the purposes herein set forth.

In testimony that I claim the foregoing I have hereunto set my hand this 24th day of February, 1879.

AMOS F. LAPHAM.

Witnesses:

JOLMA LAPHAM,

ROBT. HOPKINS.